United States Patent [19]

Isailovic

[11] 4,204,199
[45] May 20, 1980

[54] METHOD AND MEANS FOR ENCODING AND DECODING DIGITAL DATA

[75] Inventor: Jordan Isailovic, Torrance, Calif.

[73] Assignee: MCA Disco-Vision, Inc., Los Angeles, Calif.

[21] Appl. No.: 927,256

[22] Filed: Jul. 21, 1978

Related U.S. Application Data

[62] Division of Ser. No. 848,550, Nov. 4, 1977.

[51] Int. Cl.² .............................................. G06F 3/00
[52] U.S. Cl. ........................................... 340/347 DD
[58] Field of Search ................ 325/320, 321; 329/104; 360/38, 39, 40, 41; 340/347 DD; 178/66 R, 66 A

[56] References Cited

U.S. PATENT DOCUMENTS

| 3,737,895 | 6/1973 | Cupp | 340/347 DD |
|---|---|---|---|
| 3,828,344 | 8/1974 | Schwartz | 340/347 DD |
| 3,968,378 | 7/1976 | Tsuchiya | 340/347 DD |
| 3,988,729 | 10/1976 | Herman | 340/347 DD |
| 4,041,406 | 8/1977 | Hanewinkel | 325/320 |
| 4,052,558 | 10/1977 | Patterson | 325/320 |

Primary Examiner—Charles D. Miller
Attorney, Agent, or Firm—Ronald J. Clark

[57] ABSTRACT

A data handling system is described for encoding an input digital data waveform by a pulse code modulation technique useful to obtain optimum packing density for a recording medium. The encoding technique selects the binary one state of the input waveform for processing and generates an encoded waveform containing sufficient signal level transition to reconstruct the original input data waveform. The decoding technique examines the transitions present in the retrieved encoded signal and generates decoding indicia sufficient to identify all binary ones in the original digital waveform. A waveform generator recreates the original encoded waveform using selected clocking signals and the decoding indicia.

7 Claims, 9 Drawing Figures

METHOD AND MEANS FOR ENCODING AND DECODING DIGITAL DATA

This is a division of application Ser. No. 848,550, filed Nov. 4, 1977.

BACKGROUND OF THE INVENTION

1. Field of the Invention

The present invention relates to the storage and transmission of digital data by a new pulse code modulation technique. An encoder is provided to change the signals from NRZ encoded format into the new pulse code modulation format. A decoder is provided to change the encoded signals from the new format back into the NRZ encoded format.

2. Description of the Prior Art

A delay-modulation code sometimes known as the Ampex-Miller code is described in an article contained in the Electronic Design 21, Oct. 11, 1975 issue. A differential pulse code modulation technique is described in U.S. Pat. No. 3,998,729.

The present encoding and decoding technique differs from the Miller encoding format because the Miller encoded signal always has a transition in the middle of a data cell when the NRZ signal to be encoded represents a binary one. The encoding and decoding technique of the present invention does not follow this encoding format. According to the encoding procedure hereinafter described a binary one in the NRZ signal to be encoded can be represented in one of two ways, namely: first, a transition in the encoded waveform can be found in the middle of a data cell; or second, a transition in the encoded waveform can occur at transition time between data cells.

U.S. Pat. No. 3,988,729 teaches that transitions in the encoded waveform occur in the center of a data cell time for either a binary one or binary zero in the NRZ format. The signals encoded according to the procedure hereinafter described, include signal level transitions occurring in the center of a data cell time only for a binary zero in the NRZ format.

SUMMARY OF THE INVENTION

The present invention is directed to a pulse code modulation technique useful to obtain optimum packing density for the storage and/or transmission of digital information. The digital information to be processed is received by the circuitry of the present invention in NRZ format. The encoding and decoding technique described hereinafter employs minimal bandwidth and information to maintain bit synchronization capability and errorless data detection. The new pulse code modulation technique generates an encoded data cell stream containing no ambiguities and containing positive synchronizing information.

Digital data is represented in the NRZ coded format by a succession of first and second level signals. For convenience hereinafter, the binary one condition is identified as the more positive of the two binary levels and the binary zero level of the data stream is represented by the more negative of the two data levels.

The encoding technique of the present invention provides a transition in the middle of a data cell or at the transition time between adjacent data cells. The location of a transition signal in the encoded data stream for the current cell to be recorded depends in part upon where the transition was located for the data cell just previously recorded.

An inspection of the encoded data stream, encoded according to the technique of the present invention, immediately tells the observer a limited amount of definite information, for example: (a) When the distance between two transitions equals the length of one data cell, the observer knows that the second transition represents a binary one in the original NRZ code; (b) When the distance between two transitions is two bit cells in length, the observer knows (i) that a series of zeros is present in the NRZ code and (ii) both transitions occur between data cells. This is contrasted with both prior art methods when the transitions occur at the middle of the bit cell times.

In the encoding technique of the present invention, the NRZ input pulse stream is sampled to identify each binary one contained in the input NRZ data train. A first series of pulses, corresponding to the center of a data cell, are generated to identify each binary one level of the NRZ bit stream. A second series of pulses represent the clock frequency at which the NRZ encoded pulse train is processed. These last two series of pulses represent the first level indicia of the encoded data pulse train to be recorded. The two series of pulses are ANDED together and divided by four and now represent the new encoding format for the input NRZ pulse train. The newly encoded data stream is ready for recording upon a medium capable of encoding binary data. As an alternate use, the encoded data stream can be transmitted by standard equipment employed for transmitting digital data.

Upon reading back from the recording medium or upon reception of the transmitted signal, the encoded data stream is applied to a decoder circuit. The decoder circuit changes the data stream back into the NRZ format. This decoder employs a first decoding means for identifying certain of the binary ones encoded as a transition occurring in the center of a data cell. The decoder employs a second decoding means for identifying other binary ones encoded as a transition spaced one data cell from the previously encoded transition. The binary ones decoded by the second decoder means includes at least all previously unidentified binary ones.

A waveform generator recreates the NRZ encoded data stream from a clocking signal and the output signals generated by the first and second decoding means. A first waveform generator means responds to a clocking signal and the output of the first decoding means to form an intermediate signal containing a portion of the decoded information for application to a second waveform generator means. The second waveform generator also responds to a second clocking signal and the output of the second decoding means to recreate the original NRZ signal. All signals used by the waveform generator are synchronized to each other.

These and other features of the present invention will become apparent from the detailed description set forth hereinafter.

BRIEF DESCRIPTION OF THE DRAWINGS

FIG. 7 shows various waveforms A through I taken at various points of the decoder circuits shown in FIGS. 4 and 5, which are employed to explain the operation of the zero detector circuit shown wherein;

DESCRIPTION OF THE PREFERRED EMBODIMENT

The same number is used in the different Figures to refer to the same element.

As an introduction to the detailed explanation as set forth hereinafter, certain of the terms used in such explanation are explained now to avoid later repetition.

Figure 3:
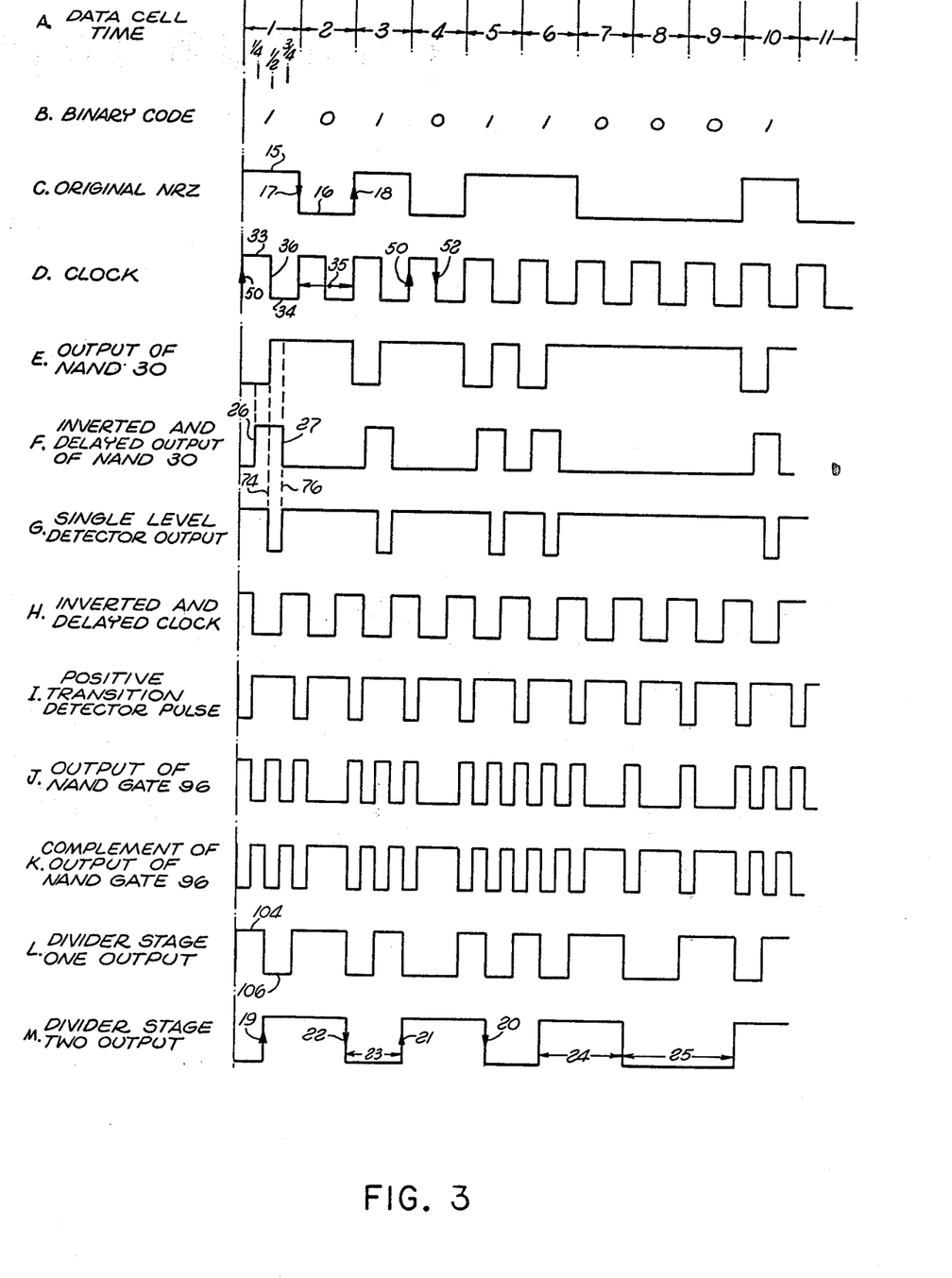
FIG. 3 is a series of waveforms A through M representative of the various signals at various points within the encoders shown in FIGS. 1 and 2.

Referring to line C of FIG. 3, there is shown a waveform encoded by a well known pulse code modulation technique identified as Non-Return to Zero (NRZ) code. The waveform contains, as shown on line A of FIG. 3, ten data cells identified by numerals 1 through 10. Hereinafter, it will be convenient to refer to individual data cells within many of the various waveforms. These references will be made using the 1 through 10 identification sequence shown on line A of FIGS. 3 and 6. The decoder introduces a one data cell delay in its decoding function. Therefore, a data cell 11 is also shown here to handle references to this data cell time. Line B of FIGS. 3 and 6 identifies the contents of each data cell 1 through 10 as a binary one or binary zero.

Complementary nomenclature can be utilized and the circuitry described hereinafter can be easily altered by well known techniques to encode and decode the opposite levels than the levels used in the preferred embodiment. Almost no modification to the illustrated circuits are needed to interchange a zero level signal for the one one level signal discussed hereinafter. By putting an inverter in the input of the encoder and take the complement of the output, identified hereinafter, the description is then applicable to the zero level.

A binary one is represented by a high signal level such as at 15, and a binary zero is represented by a low signal level such as at 16. The NRZ coding technique is characterized by maintaining the same signal level when successive and identical data levels are encoded. The waveform shown on line C has two successive binary ones and three successive binary zeros. There is no change in level in the waveform when these successive and identical data levels are encoded.

In the encoding and decoding techniques described hereinafter, certain circuits respond to the instantaneously changing direction of polarity of the applied waveform. This direction of changing polarity is identified using standard nomenclature including; a negative going edge as shown at 17 on line C and as represented by the arrowhead pointing in the direction towards the bottom of the drawing; a positive going edge as shown at 18 on line C and as represented by the arrowhead pointing in the direction towards the top of the drawing. The negative going edge is also referred to as the trailing edge, and the positive going edge is also referred to as the leading edge.

A change in signal level as from a high level at 15 to a low level at 16 is a signal level transition. This transition is also identified as a negative going transition. A change in signal level from a low level at 16 to a high level at 15 is also a signal level transition, and this direction of change is also identified as a positive going transition.

Transition time in the NRZ format occurs between data cells such as at 17 and 18. An inspection of line C shows that all signal level transitions such as 17 and 18 occur at transition time, but that not all transition times involve a signal level transition. No such signal level transition occurs between data cells 5 and 6, 7 and 8, and 8 and 9.

Figure 7:
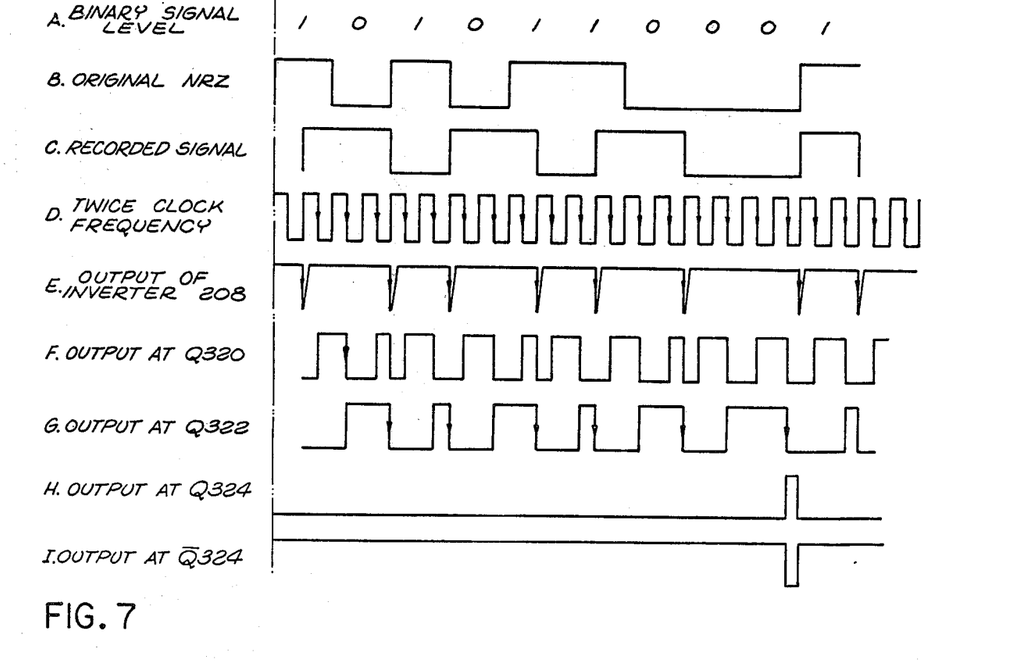

In the explanation just finished concerning the relative location of various transition times, as well as the explanation throughout the entire application, it should be kept in mind that the waveforms as shown in the several Figures are synchronized one to the other by the clock signals shown on line D of FIG. 3 and line D of FIG. 7. All waveforms are shown relative to a clock signal having a positive transition at the start of data cell 1. The clock signal shown on line D of FIG. 7 is twice the frequency of the signal shown on line D of FIG. 3. In FIG. 3, one cycle of the clock signal corresponds to each data cell time, while in FIG. 7, two cycles of the clock signal corresponds to each data cell time.

Referring to line M of FIG. 3, there is shown the Jordan encoded waveform for the NRZ code shown in line C. The Jordan encoded waveform contains no ambiguities and has the same power spectral density distribution as the previously mentioned Miller code for random data pattern.

Figure 1:
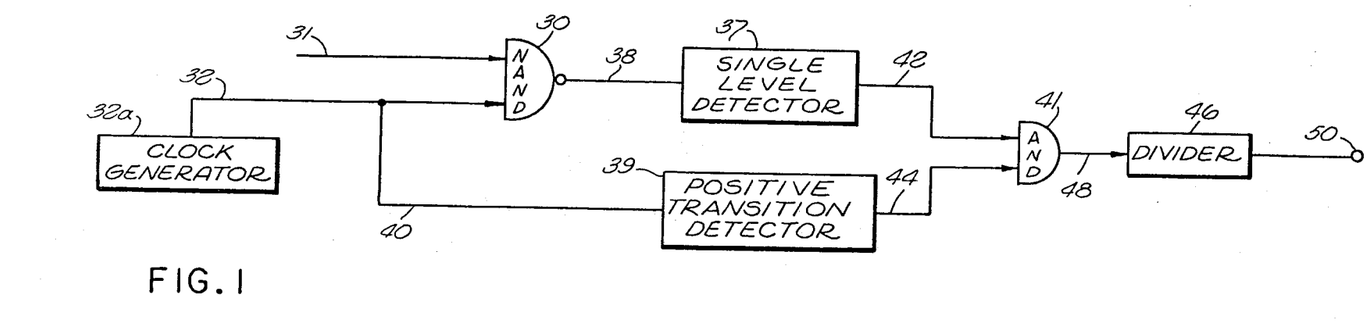
FIG. 1 is a simplified block diagram of the encoder circuitry.
Figure 2:
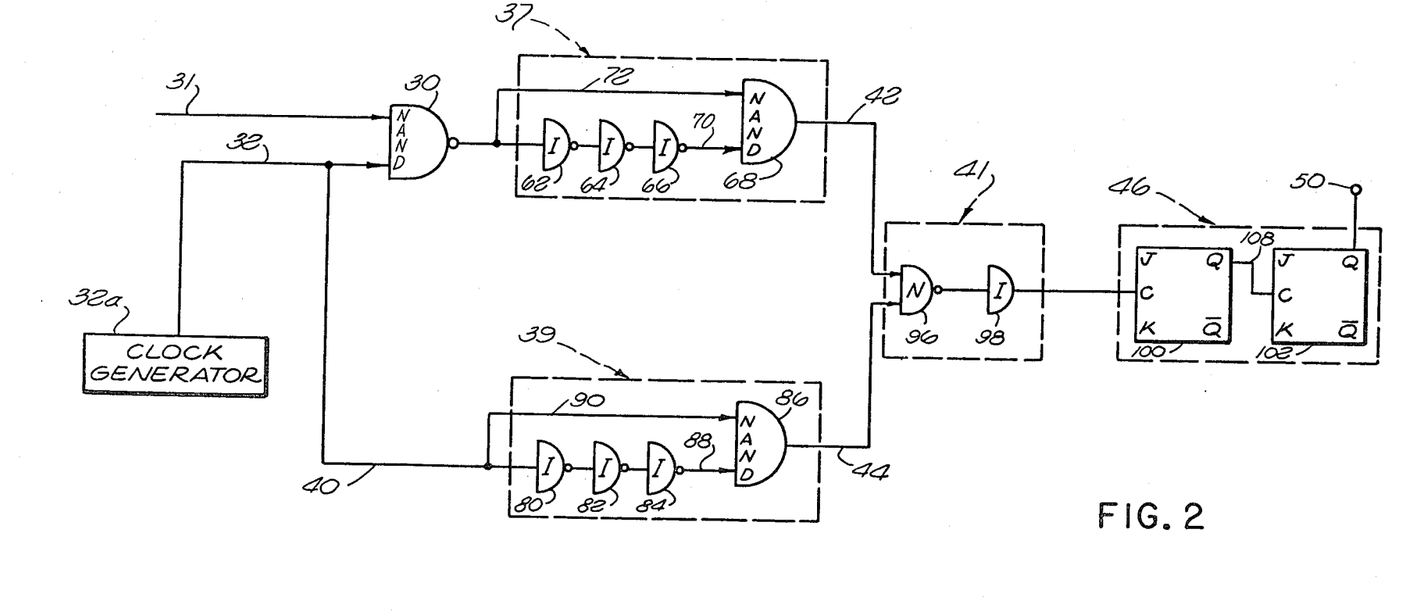
FIG. 2 is a more detailed block diagram of the encoder circuitry.

Because of the method of operation of the encoding circuitry shown in FIGS. 1 and 2, the Jordan code shown in line M has several unique characteristics. First, both positive and negative signal level transitions may occur at mid data cell time as shown at 19 and 20, respectively. Mid data cell time is broadly defined as any time other than start of data cell time or end of data cell time. In the preferred embodiment, mid data cell time occurs half way between start of data cell time and end of data cell time. Secondly, both positive and negative signal level transitions may occur at end of data cell time as shown at 21 and 22, respectively. Thirdly, the spacing between successive transitions can equal one data cell time as indicated by the length of the line 23, one and one half data cell time as indicated by the length of the line 24, and two data cell lengths as indicated by the length of the line 25.

The start and end of each data cell in the NRZ format occurs at a point identified as the transition time between successively positioned data cells. Obviously, the end transition time of one data cell corresponds to the start transition time of the next successively positioned data cell.

For convenience, each data cell has been divided into quarters as best identified with reference to data cell 1 shown on line A of FIG. 3. These quarters are identified as the first, second and third quarters.

Throughout the remaining explanation of the signal processing achieved by the circuitry of the present invention, it is important to accurately describe the condition of a signal at various points within each data cell. To avoid confusion, the following brief description is used throughout all the waveforms. Two characteristics of the signal are given: the first is the time of the signal, and the second is the direction. The direction is either negative going as at 17 on line C of FIG. 3, or positive going as at 18 on line C of FIG. 3. The time of the signal can be at mid data cell time as at 19 and 20, at start or end of data cell time as at 21 and 22, respectively, at ¼ data cell time as at 26 as shown on line F of FIG. 3, and at ¾ data cell time as at 27 as shown on line F of FIG. 3.

The spacing between transitions and the positioning of the signal level transition all cooperate to uniquely encode the NRZ data. One unique distinguishing feature of the Jordan code shown on line M concerns the spacing of successive transitions at two data cell lengths as shown by the line 25. Whenever this spacing is present in the Jordan code, the decoding circuitry identifies both transitions as occurring at transition time. This feature is employed to keep the decoding circuitry synchronized to the incoming data stream.

Referring to FIG. 1, there is shown a simplified block diagram of the encoder portion of the present invention. The waveforms shown in FIG. 3 are used to explain the signal processing capability of the encoder portion of the present invention shown in both FIGS. 1 and 2. The NRZ signal shown in line C of FIG. 3 is applied to a NAND-gate 30 over an input line 31. The NAND-gate 30 has a second input signal on a line 32. The input signal on the line 32 is the clock signal as shown on line D of FIG. 3, generated by the clock circuit 32a. The clock circuit 32a is of standard design and need not be further described.

The NRZ signal shown on line C of FIG. 3 is characterized by the use of the first higher level signal shown at 15 as a binary one and the lower voltage level shown at 16 as a binary zero. The clock signal shown on line D of FIG. 3 is characterized by having its first portion shown at 33 as the higher of the two voltage levels and the second portion at 34 at the lower voltage level. The length of a line 35 represents the time duration of a full data cell. A full cycle of the clock input signal occurs each data cell time. The transition between the two voltage excursions 33 and 34 of the clock signal as represented by the line 36 represents the transition at mid-data cell time.

Referring again to FIG. 1, a single level detector 37 is responsive to the output of the NAND circuit 30 as applied thereto over a line 38. A positive transition detector 39 is responsive to the clock signal as applied thereto over a line 40. The output signal from the single level detector 37 is applied to an AND function circuit 41 over a line 42. A second input signal to the AND function circuit 41 is applied from the output of the positive transition detector 39 over a line 44. The output signal from the AND function circuit 41 is applied to a divider circuit 46 over a line 48. The output signal from the divider circuit 46 is applied to an output terminal 50 from which it is available to be recorded or transmitted by other circuitry as desired.

The single level detector 37 is a means for providing an output signal whenever the input NRZ waveform of pulses is in one of its two predetermined levels 15 or 16 as shown on line C of FIG. 3. In the embodiment described hereinafter, the detector 37 identifies the binary zero levels present in the input NRZ waveform.

For the preferred embodiment, the single level detector generates an output pulse each time the input data level represents a binary one. The output pulse of the single level detector is characterized by beginning at mid-data cell time, and is a negative going pulse. The duration of the pulse generated by the single level detector 37 is determined by the input characteristics of the divider circuit 46. More specifically, the duration of the output pulse from the single level detector 37 need only be long enough to drive the divider circuit 46. The series of output pulses from the single level detector 37 is shown more specifically on line G of FIG. 3.

The positive transition detector 39 generates an output pulse corresponding to each positive going excursion 50 of the input clock signal train as shown on line D of FIG. 3. The output pulses from the single level detector 37 represent a first level encoding indicia identifying each binary one in the NRZ input pulse train. The output from the positive transition detector 39 represents first level encoding indicia identifying each positive going excursion of the input clock signal.

The AND function circuit 41 combines the output signal trains present on lines 42 and 44 into a series of pulses which represent all the information necessary to reconstruct the encoded NRZ signal. While the output signal from the AND function 41 could be recorded or transmitted as it appears on line K of FIG. 3, the waveform shown on line K contains some redundant information and its frequency can be reduced by dividing the output from the AND function circuit 41 by four.

Referring to FIG. 2, there is shown a more detailed logic diagram of the encoder circuit portion of the present invention. The NRZ signal to be encoded is applied to the NAND-gate 30 over the line 31. The clock signal is applied to the NAND-gate 30 over the line 32. The output from the NAND-gate 30 is applied to a plurality of serially connected inverters 62, 64 and 66 which form a part of the single level detector 37. The output from the inverter 66 is applied to a NAND-gate 68, over a line 70. The output from the NAND-gate 30 is also applied as a second input to the NAND-gate 68 over the line 72.

The two inputs to the NAND-gate 68 can be seen on lines E and F, respectively, of FIG. 3. The output of the NAND-gate 30 is a negative going pulse having the duration of one-half of a data cell and beginning at the positive transition time 50 of the clock time and ending at the negative transition time 36 of the clock signal. The input signal to the NAND-gate 68 on line 70 is shown on line F of FIG. 3. This is the inverted and delayed representation of the signal shown on line E. The term of the delay is represented by the duration between the dotted lines 74 and 76 shown between lines E, F and G of FIG. 3. This period is generated by the delay characteristics of the inverters 62, 64 and 66. Since Schottky type circuits are employed in the inverters 62, 64 and 66, three stages are necessary as each stage has an inherent delay of approximately five nanoseconds. If TTL-type circuits are used, only a one such inverter stage would be necessary as TTL logic has a 15–20 nano-second internal delay. The only function of the inverter stages 62, 64 and 66 is to create an inverted representation of the output of the NAND-gate 30 having a delay sufficiently long to drive the circuits used in the divider stage 46.

The normal functioning of a NAND-gate is to provide a negative going pulse when the two input signals to the NAND-gate are at the positive signal level. Accordingly, this would occur only during the period of delay generated by the inverters 62, 64 and 66 as better seen on line G of FIG. 3. The negative going pulse on line G of FIG. 3 is characterized as having a duration equal to the delay generated by the inverter stages 62, 64 and 66 and having a leading edge which corresponds to the negative going transition 36 of the clock signal as shown on line D of FIG. 3. As previously mentioned, the important characteristics of the present pulse pulse code modulation technique is to generate a pulse beginning at the mid cell time of each data cell of the NRZ code positioned at the binary one level. The pulse train shown on line G is such a sequence of pulses.

The positive transition detector 39 comprises a plurality of inverter stages 80, 82 and 84 which are connected in series and provided one input to a NAND-gate 86 over an input line 88. A second input signal to the NAND-gate 86 is provided over a line 90 which represents the clock signal as shown on line D of FIG. 3. The signal applied as an input to the first inverter stage 80 is also the clock signal as represented on the line 40. The clock signal applied to the series connected inverter stages 80, 82 and 84 is delayed and inverted and is shown on line H of FIG. 3. The output signal from the NAND-gate 86 is a negative going pulse whenever the two input signals are at the positive binary level. This series of pulses is shown on line I of FIG. 3. Each pulse on line I corresponds to the start of each clock cycle as shown on line D of FIG. 3.

The AND function circuit 41 comprises a NAND-gate 96 and an inverter 98. The input to the NAND circuit 96 is the output of the NAND-gate 68 on the line 42. A second input signal to the NAND-gate 96 is the output of the NAND-gate 86 on the line 44. The function of the NAND circuit 96 is to provide a negative output signal level when each of the input signals is at a binary one level at the same time. When the input signal is a binary zero condition, the output signal is also at the binary one level. Line J of FIG. 3 represents the output signal from the NAND-gate 96. The output signal from NAND-gate 96 is applied to the inverter 98 and the output signal of the inverter 98 is shown on line K of FIG. 3.

The divider circuit 46 comprises a pair of serially connected JK flip-flops 100 and 102. The JK flip-flop 100 is triggered to each of its stable states by an input negative going pulse of sufficient duration to trigger the JK flip-flop. As previously mentioned, the function of the series connected inverters 80 through 84 and 62 through 66 is to create a pulse of sufficient duration to trigger the JK flip-flop 100.

The operation of each flip-flop used herein employs the following nomenclature. Each flip-flop has two stable states which are reflected by its available output signals. These two output signals are a high output signal such as at 104 on line L of FIG. 3 and a low output signal such as at 106 on line L. Both the high output signal and the low output signal is available at the non-inverted output terminal Q and the inverted output terminal $\overline{Q}$. The Q and $\overline{Q}$ terminals are further given the same numeral as used to identify their respective flip-flop.

The output signal from the JK flip-flop 100 is on a line 108 and is shown as line L of FIG. 3. Output signal from the Q 100 terminal is applied to a second JK flip-flop 102 by the line 108. The output from the second JK flip-flop 102 is shown on line M of FIG. 3. The output signal from the Q 102 terminal is applied to the output terminal 50 for application to recording and/or transmission apparatus.

Figure 4:
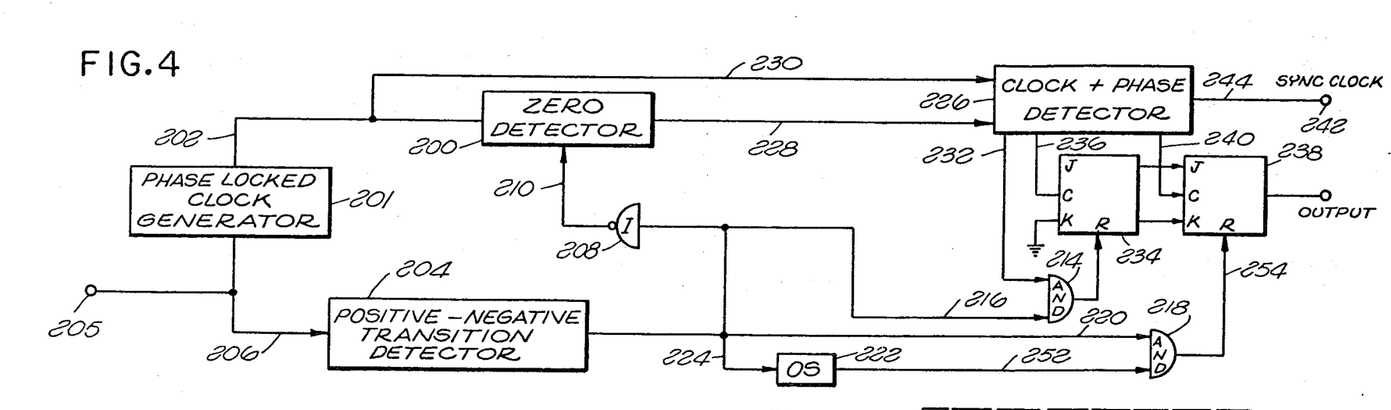
FIG. 4 is a simplified block diagram of the decoder circuit.

Referring to FIG. 4, there is shown a simplified block diagram of the decoder circuit employed in the present invention. A zero detector circuit 200 has a first input signal applied thereto from a phase locked clock generator 201 over a line 202. The clock 201 is of standard design and need not be described further. The output of the clock 201 is the input timing signal having a frequency of twice the clock signal shown on line D of FIG. 3. The twice clock signal waveform applied to line 202 is shown on line D of FIG. 7.

The input clock frequency is synchronized to the received input data waveform by conventional phase locked loop bit synchronizing circuits.

A positive-negative transition detector is shown at 204 having its input signal from a data terminal 205 over a line 206. The function of the detector circuit 204 is to provide an output pulse for each signal level transition which occurs in the received input data waveform. The output from the detector 204 is applied to many other portions of the decoder circuitry, one of which is to an inverter stage 208. The function of the inverter 208 is to provide an inverted output signal to reset the zero detector circuit 200. The output from the inverter 208 is applied to the zero detector over the line 210.

The function of the zero detector circuit 200 is to identify two consecutive data cell signals in the input data stream that are positioned at the binary zero level. Such a sequence of binary zeros in shown in line D of FIG. 6 as represented by the length of the line 25. The internal operation of the zero detector 200 will be described in more detail with reference to FIG. 5 hereinafter.

The output from the detector 204 is applied to an AND-gate 214 over a line 216. The output from the detector 204 is applied to a second AND-gate 218 over a line 220. The output from the detector 204 is applied to a one-shot circuit 222 over a line 224.

The output of the zero detector 200 is applied to a clock and phase generator 226 over a line 228. The clock and phase generator 226 receives as its second input signal the input timing signal at twice the clock frequency over a line 230. The clock and phase generator 226 has a plurality of output signals. A first output signal is applied to the AND-gate 214 over a line 232. A second output signal is applied to a first JK flip-flop 234 over a line 236. A third output signal from the clock and phase generator 226 is applied to a second JK flip-flop 238 over a line 240. The synchronous clock output signal is applied to an output terminal 242 over a line 244.

In review, the characteristics of the format of the code generated by the encoder circuitry of the present invention includes a signal level transition appearing in the new encoded format, at mid data cell time, for selected binary ones in the initial NRZ code. A second characteristic of the new format includes a pair of signal level transitions to identify other binary ones in the initial NRZ code. The distance between such a pair of pulses is one data cell time.

Since these are the characteristics of the recorded signal, circuity is required in the decoder to detect these characteristics. The function of the AND-gate 214 is to select all transitions which occur in the middle of a data cell time. The AND-gate 214 achieves this result by a combination of its input signals including the ANDING of pulses received from the detector 204 with the timing pulse received on a line 232.

The input signal to the AND-gate 214 over the line 216 is a series of pulses which correspond to both the positive going 19 and negative going 22 signal level transitions in the recorded waveform. As shown on line F of FIG. 6, the pulses may occur at mid-data cell time, as shown by numeral 246, or at start/end transition times 248 and 250, respectively, as shown on line F of FIG. 6. It is the function of the gate 214 in combination with the input signals on the line 216 and 232 to identify those signal level transitions which occur at mid-data cell time.

The second characteristic of the recorded signal is that when the distance between transitions equals one data cell time then one or both transitions represent a binary one. Accordingly, it is the function of the one-shot circuit 222 in combination with the AND-gate 218 to provide such a function. The output of the one-shot is applied as a second input to the AND-gate 218 over a line 252. The output of the detector 204 is applied directly as a first input to the AND-gate 218, and is applied by way of the one-shot 222 as a second input to the AND-gate 218.

Functionally speaking, when a pair of pulses, separated by one data cell time, is generated by the detector 204, the first pulse becomes an enabling pulse for the second. The one-shot 222 stretches the first pulse to provide an enabling pulse to the AND-gate 218 for the second pulse.

Figure 5:
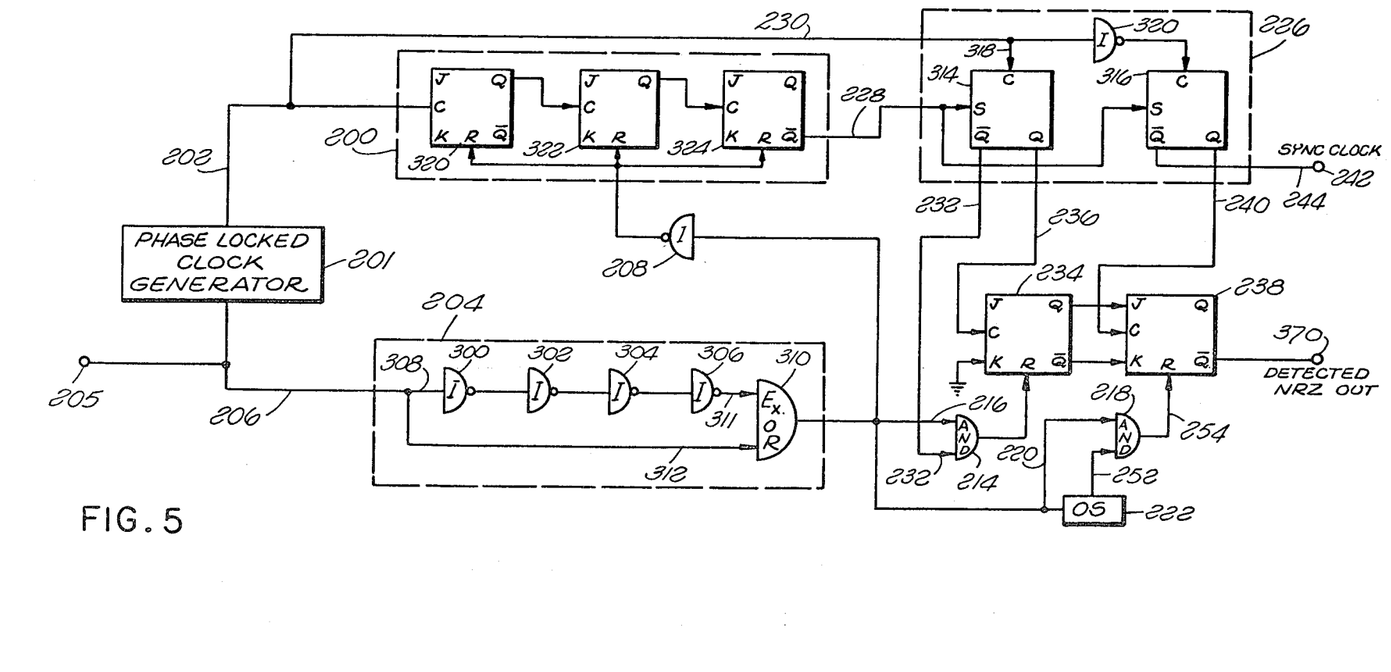
FIG. 5 is a more detailed block diagram of the decoder circuit.
Figure 6:
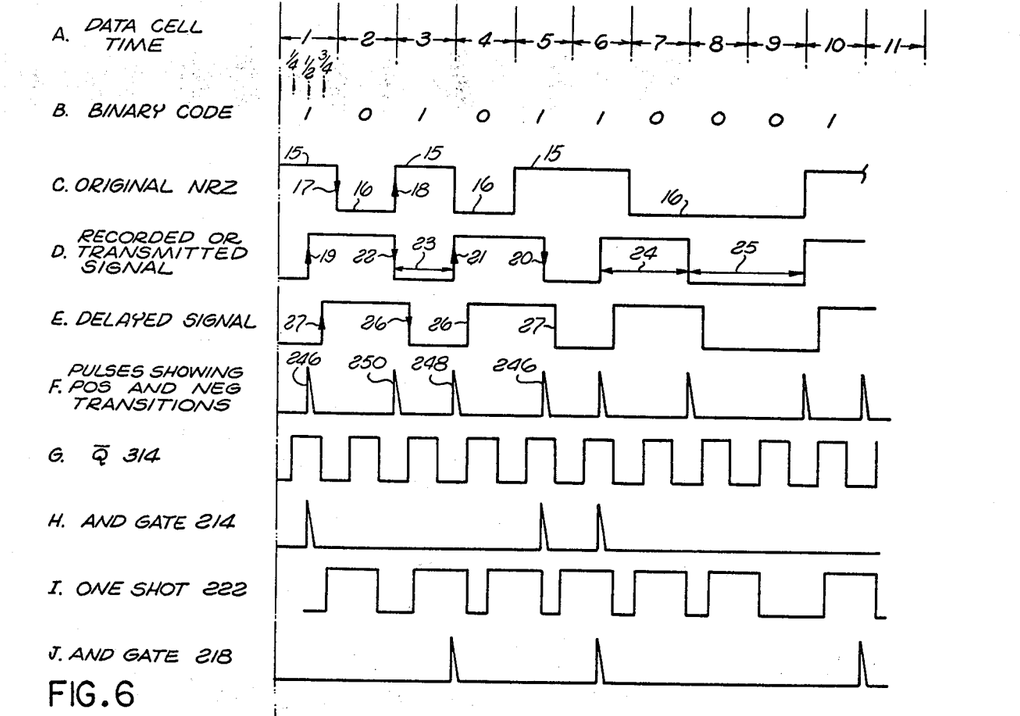
FIG. 6 shows various waveforms A through J taken at various points within the decoder circuit shown in FIGS. 4 and 5.

FIG. 5 shows a more detailed schematic diagram of the decoder circuit employed in the present invention. FIG. 6 shows a portion of the waveforms which relate to the detector 204 and the AND-gates 214 and 218.

Line A of FIG. 6 identifies the data cell times used herein. Line B identifies the binary content of the NRZ waveform shown on line C.

Line C of FIG. 6 shows the original NRZ pulse code format of the information to be recorded. Line D shows the Jordan code format encoded by the circuits shown in FIGS. 1 and 2. The Jordan code format present at the input data terminal 205 of FIG. 5 is applied to the detector 204 by the line 206. The detector 204 comprises a plurality of inverter stages 300, 302, 304 and 306 serially connected. It is the function of the inverter stages to provide a sufficient delay to the Jordan coded signal for detecting both the positive and negative going signal level transitions present in the Jordan code. The Jordan code shown on line D of FIG. 6 is applied at the input to the inverter 300 on a line 308. The Jordan code is also applied to an exclusive OR-gate 310 over a line 312. The output from the inverter 306 is present on a line 311 and is shown on line E of FIG. 6.

The exclusive OR-gate 310 generates an output pulse stream as shown on line F of FIG. 6. This mode of operation of the exclusive OR function is standard. An output positive pulse is generated whenever its two input signals are at opposite signal levels and generates an output signal at the negative level whenever its two input signals are at the same signal level.

The output pulse train from the exclusive OR-gate 310 is applied to the AND-gate 214 over the line 216. The AND-gate 214 receives its second input signal over line 232, the timing signal from the clock and phase generator 226 applied over the line 232.

Referring more specifically to the clock and phase generator 226, the generator 226 comprises a first flip-flop 314 and a second flip-flop 316. The input timing signal over the line 230 is applied directly to the input terminal C of the flip-flop 314 over a line 318. The flip-flop 314 is of the type which is identified as a trailing edge flip-flop. It changes its stable state whenever a downward going edge of a pulse is applied to the C input of the flip-flop. The input timing pulses are applied to the second flip-flop 316 by way of an inverter 320. The inverter 320 reverses the polarity of the incoming pulse train and causes the flip-flop 316 to seemingly respond to the leading edge of the timing pulse train, because of the reversal of polarity by the inverter 320. The detailed operation of the clock and phase generator 226 will be described in greater detail with reference to the timing waveforms shown in FIG. 8.

However, for the continued explanation of the operation of the AND-gate 214 the only input from the clock and phase generator 226 applied thereto is the $\overline{Q}$ 314 waveform shown on line G of FIG. 6. The waveform shown on line G of FIG. 6 is identical to that shown on line D of FIG. 8. The output signal from the AND-gate 214 is shown on line H of FIG. 6, wherein a positive going pulse is generated whenever both signals applied as an input to the AND-gate 214 are at the binary one level.

The waveform shown on line G of FIG. 6 provides an enabling signal, during the second and third quarters of a data cell time, to the AND-gate 214. In this manner, it is able to gate through the AND-gate 214 those pulses from the detector 204 which occur in the middle of a data bit cell time. The output from the AND-gate 214 is applied as a reset pulse to the flip-flop circuit 234.

The output pulse stream from the exclusive OR-gate 310 is applied to a one-shot 222 and as a first input to an AND-gate 218. The function of the one-shot 222 is to act as a pulse stretcher and generate an output signal lasting longer than one data cell time and less than one and a half a data cell times. Its waveform is shown on line I of FIG. 6. The output of the AND-gate 218 is shown on line J of FIG. 6 wherein an output pulse is generated whenever the output from the one-shot 222 and the output signal from the detector 204 are both at the high output level.

An inspection of lines F and I of FIG. 6, shows the input to the one-shot 222, and the output from the one-shot 222. The output of the one-shot only changes to its second or enabling level after its input signal is removed. This delayed reaction prevents the one-shot 222 from gating through the AND-gate 218 each pulse from the detector 204. The output from the one-shot 222 remains at the enabling level longer than one data cell time. This allows the one shot to gate through the AND-gate 218 those pulses in waveform F of FIG. 6, which follow a previous pulse by one data cell time.

Each binary one in the original NRZ pulse train is encoded in one of two ways: (a) a signal level transition is generated in the mid data bit cell time; or (b) a pair of signal level transitions separated by one data cell time. Accordingly, in the decode function the AND-gate 214 identifies those signal level transitions which occur in the middle of a data cell time and the AND-gate 218 identifies those pairs of signal level transitions separated by one data cell time in the encoded pulse train. Now that all the control information has been abstracted from the incoming Jordan code, the remaining circuitry is employed for translating the pulses into the NRZ coded format.

Referring to FIG. 7, there is shown a series of waveforms generated by the zero detector circuit 200 whereby a synchronization pulse is generated whenever a series of three binary zeros are present in the original NRZ code. While an identical synchronization pulse can be generated when two binary zeros occur in the NRZ waveform under certain circumstances this last mentioned condition will not be further explained as it is a condition that will generate a synchronization pulse depending upon the condition of a plurality of bit cells which precede the two binary zero pulses. As this is a variable, the Jordan code depends upon three binary zeros in sequence to generate its synchronization pulse. When three binary zeros occur in sequence it is known that the synchronization pulse will be generated having a positive going transition existing exactly at the start of a data cell time. This positive going transition at the start of a data cell time is used to set the flip-flops 314 and 316 in the clock and phase generator 226. In the event that these flip-flops should drift out of synchronism with relation to the incoming NRZ code, the synchronization pulse will immediately resynchronize the timing signals generated by the generator 226 with the incoming NRZ code.

The original NRZ data stream is shown on line B of FIG. 7, while the Jordan code equivalent thereof is shown on line C. The binary equivalent to the NRZ code is shown on line A. The input timing signal present on line 202, as shown in FIG. 5, is shown on line D of FIG. 7. Line E of FIG. 7 shows the output of the inverter stage 208. Line E of FIG. 7 is the inverted signal of that signal shown on line F of FIG. 6.

The zero detector 200 comprises a plurality of flip-flop stages 320, 322 and 324. Each of these flip-flops is operating as a divide by two stage which responds to the negative going transition of the input signal applied to its clock terminal C identified in each of the flip-flops or to its reset terminal R in each of the flip-flops. The output from the Q terminal of flip-flop 320 is shown on line F of FIG. 7. A negative going transition applied to the C input terminal causes the respective flip-flop to change stable states. A negative going transition applied to the R input terminal resets the flip-flop to that stable state wherein a low output signal level is available at that flip-flop's Q output terminal.

The output waveform of the first divide by two flip-flop 320 is traditionally taken from its non-inverted output terminal identified as the Q terminal. The non-inverting Q terminal of flip-flop 320 is identified as Q 320, the Q terminal of flip-flop 322 is identified as Q 322 and the Q terminal of flip-flop 324 is identified as Q 324. The inverting terminal of flip-flop 324 is identified as $\overline{Q}$ 324.

It was previously mentioned that the flip-flop 320 divides its input signal applied to terminal C by two by changing state each time a negative going transition is applied to the C terminal. Additionally, the flip-flop 320 is placed in one stable state each time a reset pulse is applied to the R terminal of flip-flop 320. The reset pulse on line E of FIG. 7 places each of the flip-flops 320, 322 and 324 into that stable state wherein a low output signal is generated on the Q terminal of the flip-flop. A detailed explanation follows explaining the waveform shown on line F of FIG. 7. The negative going transition of the waveforms shown on lines D and E cooperate to form the waveform shown on line F.

The negative going transition of the pulse occurring during the mid data cell time from the inverter stage 208 sets the output signal of Q 320 to its low output level. The negative going transition of the signal occurring at three-quarters data cell one time in the signal shown in line D sets the output signal occurring at Q 320 to its high output level. The negative going transition occurring at one-quarter data cell two time on line D resets the output of 320 to the low output level. The negative going transition occurring at three-quarters data cell two time on line D resets the output of Q 320 to the high output level. The negative going transition of the reset pulse from inverter stage 208 occurring at the start of data cell three time on line E sets the output of Q 320 to the low output level. The negative going transition at one-quarter data cell three time resets the output of Q 320 to the high output level. The negative going signal occurring at three-quarter data cell three time resets the output of Q 320 to the low output level. The negative going signal occurring at start of data cell four time on line E does not cause a change in the output from Q 320 because Q 320 is already in the low output condition and a negative going signal on the reset line always places the flip-flop in that state such that a low output signal is available at the Q 320 terminal. The remaining waveform on line F of FIG. 7 is generated in a similar manner. Restating, the negative going signal on line D changes the stable state of the flip-flop 320 while the negative going pulse from inverter stage 208 sets the flip-flop 320 so that a low output signal level is present on its Q output terminal.

Referring to line G of FIG. 7, the output waveform from the Q 322 terminal is shown. The output signal at the Q 322 terminal is generated in an identical fashion to that previously discussed with relation to Q 320.

The flip-flop 322 receives one input signal on its C terminal. This signal is the Q 320 output signal as shown on line F of FIG. 7. The second input signal applied to flip-flop 322 is the reset pulses applied to its R terminal. The flip-flop 322 responds to these input signals as follows: a negative transition from inverter 208, as shown on line E, resets the flip-flop 322 to that stable state whereby a low output signal is available at its output terminal Q 322; and a negative transition from the Q 320 terminal causes the flip-flop to change its stable state.

Accordingly, when describing the switching of the flip-flop 322, the waveforms shown on lines E and F provide the input signals thereto.

The negative transition from the inverter 208 occurring at mid data cell one time resets the Q 322 to its low output level. The negative going transition at one-quarter data cell two time, as shown on line F of FIG. 7, switches Q 322 to its high output level.

Both the negative transition from the inverter 208 and the negative transition from Q 320 at start of data cell three time, switches Q 322 to its low output level. The negative transition from Q 320 at three-quarter data cell three time from Q 320 changes Q 322 to its higher output level. The negative transition of the inverter 208 at start of data cell four time resets Q 322 to its low output level. In this manner, the remaining portion of the waveform on line G is formed.

The negative going transition of the reset pulses on line E of FIG. 7, set the flip-flop 324 to that stable state where the Q 324 terminal has its lower output level. Each negative going transition in the waveform shown on line G has the potential of changing the then current stable state of flip-flop 324. An inspection of lines E and G shows that for every negative going transition on line G which would like to change the current stable state of flip-flop 324 there is a negative going transition from inverter 208 which resets flip-flop 324 to that stable state where the Q 324 terminal is at its low output signal. The only exception is the negative transition from Q 322 at three-quarter data cell nine time which sets Q 324 to its higher output level. This change is followed by a negative transition from inverter 208 at start of data cell ten time which resets Q 324 to its low output level. The pulse which appears on line H has a negative going transition at start of data cell ten time. This transition coincides with the end of the three binary zeros shown on lines A and B.

It is the function of the zero detector 200 to generate a synchronization pulse from $\overline{Q}$ 324 whenever three binary zeros are present in the original NRZ data stream. The complement of the waveform shown in line H of FIG. 7 is shown on line I of FIG. 7. The complement is utilized in the present invention because the flip-flop 314 is a trailing edge flip-flop and responds to the positive going edge of the pulse shown on line I. This positive going edge occurs exactly at the transition between two adjacent data cells and this edge causes a resynchronization of the internal clock and phase generator with the received Jordan encoded data if needed.

Figure 8:
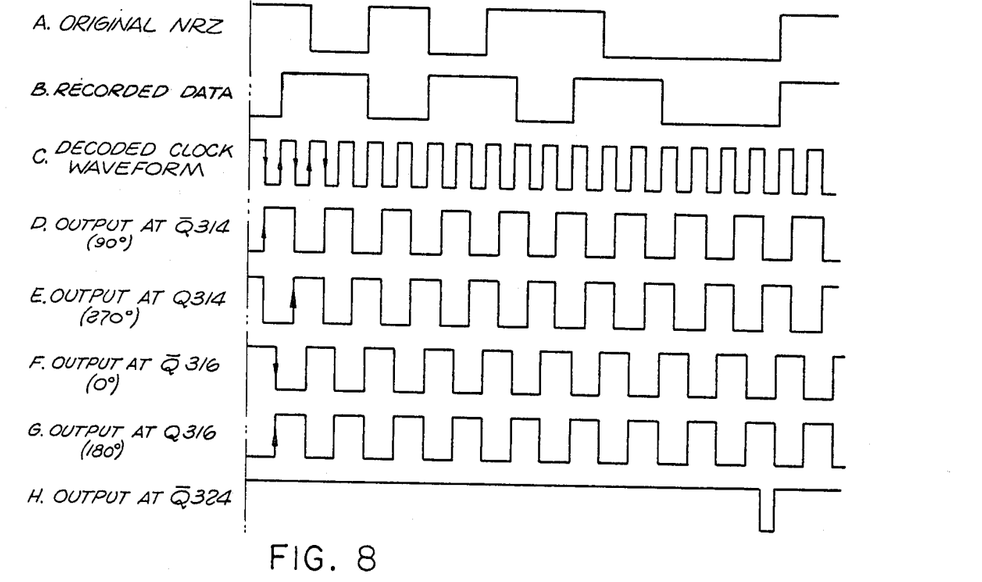
FIG. 8 shows various waveforms A through H which are employed to explain the operation of the clock and phase generator shown in FIGS. 4 and 5.

Referring to FIG. 8 there is shown a group of waveforms which relate to the operation of the clock and phase generator 226. The clock and phase generator comprises a pair of flip-flops which respond to the trailing edge or negative going edge of the applied waveform at its C input terminal. The input clock frequency is applied directly to the flip-flop 314 and is applied to the flip-flop 316 by way of an inverter 320. Accordingly, the output signal at Q 316 from the flip-flop 316 is ninety degrees out of phase with the output signal Q 314 from the flip-flop 314. As is characteristic in all flip-flops, one of the output signals from the Q 314 terminal of flip-flops 314 is one hundred eighty degrees out of phase with the signal from the Q 314 output terminal from the flip-flop 314. Additionally, the output signal from the Q 316 output terminal of flip-flop 316 is one hundred eighty degrees out of phase with the output signal from the $\overline{Q}$ 316 terminal.

Line A of FIG. 8 shows the original NRZ code. Line B shows the recorded Jordan coded format. Line C shows the input clock frequency which is twice the frequency of the applied data. Referring collectively to lines D and E of FIG. 8, the output state of the flip-flop 314 changes with each negative going edge of the input data clock. Referring to lines F and G, the stable state of the 316 flip-flop changes simultaneously with the positive going edge of the applied input clock. Since the input clock is applied to the 316 flip-flop by way of the inverter 320, in reality the flip-flop 316 responds to a negative going edge of the applied input clock but inverted ninety degrees.

Line H of FIG. 8 is identical with line I of FIG. 7. This shows the synchronizing reset pulse occurring at the start of data cell ten time. In the event that the output waveforms from the flip-flops 314 and 316 fall out of synchronization with the incoming Jordan code, this reset pulse would resynchronize the generation of the output waveforms on line D, E, F and G to be in synchronization with the Jordan incoming code. The waveform shown on line F, FIG. 8 is the $\overline{Q}$ 316 output signal and is applied to the clock sync terminal 242 by way of a line 244.

Figure 9:
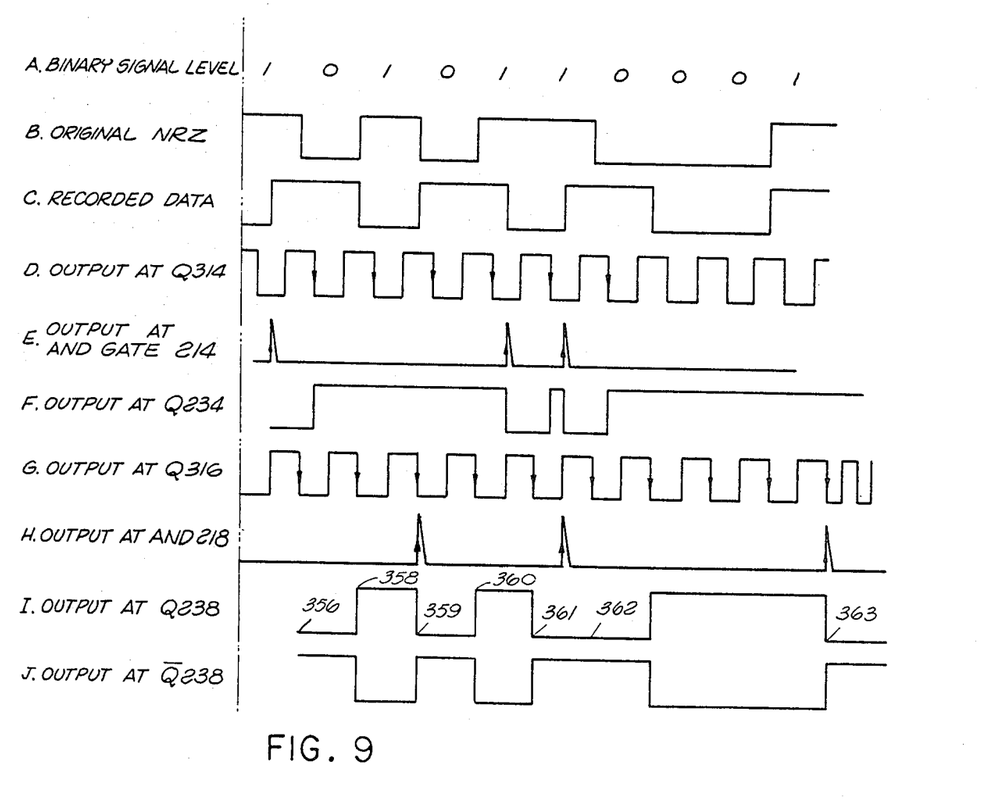
FIG. 9 shows various waveforms A through J which are employed to explain the operation of the waveform generator shown in FIGS. 4 and 5.

Referring to FIG. 9, there is shown a plurality of waveforms associated with the generation of the NRZ code from the Jordan encoded format. Line A shows the binary equivalent of the original NRZ code. Line B shows the original NRZ encoded format. Line C shows the Jordan format for recording the digital data. Line D is a repeat of the $\overline{Q}$ 314 waveform as previously shown on line E of FIG. 8. Line E shows the waveform generated by the AND-gate 214 which is a repeat of line H of FIG. 6. The waveform shown on line F is the Q 234 output of the flip-flop 234 which is generated in response to the two input pulse trains to the JK flip-flop as shown on lines D and E of this Figure 9.

The flip-flop 234 operates according to the following logic signals: a negative going transition applied to its C input terminal will change the operating state of the flip-flop only from a low signal level to a high signal level as sensed at its Q 234 output terminal. A positive signal lever transition applied to the C input of 234 does not change the stable state of flip-flop 234. When a high output level is available at Q 234, a negative input transition at the C input terminal does not affect the operating state of the flip-flop 234. The positive going edge of the reset pulse applied to the R terminal of flip-flop 234, resets the flip-flop so that a low output signal is available at the Q 234 terminal.

Line G of FIG. 9 shows the Q 316 output from the flip-flop 316 which is a repeat of the waveform shown on line G of FIG. 8. Line H shows the waveform output from the AND-gate 218 which is also a repeat of the waveform shown on line J of FIG. 6.

Line I shows the Q 238 output signal from the flip-flop 238 which is generated as a result of the second decode function performed by the flip-flop 238. The flip-flop 238 decodes the applied input pulse train shown as line F of FIG. 9 as gated by the clock signal as shown on line G of FIG. 9 and reset by the pulses shown on line H of FIG. 9. Accordingly, the flip-flop 238 is a second decoding means for converting the intermediate signal from Q 234 to exhibit a binary one signal whenever the original NRZ coded format contained a binary one signal as indicated by a pair of pulses separated by one bit cell time in the first encoding indicia pulse train.

Referring in more detail to the waveform shown in FIG. 9, the Q 314 pulse train, shown on line D of FIG. 9, is applied to the C input terminal of the first decoding means 234. The output from the AND-gate 214 is applied to the reset terminal (R) of the first decoding flip-flop means 234. In response to the leading edge of the output pulse from the AND-gate 214, the flip-flop 234 is set to its first stable state wherein it generates a low output signal at its Q 234 output terminal. At one-quarter data cell two time, the negative transition of the Q 314 signal applied to the C input terminal of the flip-flop 234 changes the stable state of the flip-flop 234 to generate a high output level. The flip-flop 234 is now in that stable state whereby additional negative transitions from Q 314 which occur at one-quarter data cell three time does not change the stable state of the flip-flop 234. The flip-flop 234 does not change states in response to the negative transition of the waveform from Q 314 shown at one-quarter data cell time of data cells 4 and 5 for the same reason.

The positive transition of the pulse shown at mid data cell five time, shown in line E of FIG. 9, drives the flip-flop 234 to its other stable state whereby it generates a low output signal at Q 234. The negative transition occurring at one-quarter data cell six time resets the flip-flop to its other stable state so as to generate its high output signal as shown on line F. The positive transition reset pulse occurring at one-half data cell six times resets the flip-flop 234 to its other stable state wherein it generates its low output signal as shown on line F.

The next negative transition of the Q 314 waveform occurs at one-quarter data cell seven time. This resets the flip-flop 234 to its other stable state for generating its high level output signal. Each of the succeeding negative going excursions of the Q 314 pulse train do not change the stable state of the first decoding means 234.

The waveform as shown on line F of FIG. 9 exhibits a first level decoding result. The decoding means 234 in effect has altered the applied input signals thereto to represent a first stable state for each pulse which appears in the pulse train shown on line E. The pulses shown on line E correspond with pulses which were originally encoded to represent the mid data cell time of a binary one in the original NRZ code. Accordingly, the waveform shown on line F is a partially decoded signal and now contains information representative of the binary ones previously encoded by use of a pulse positioned at mid data cell time.

The second decoding means 238 responds to a plurality of input waveforms. The first input waveform is the Q 234 waveform shown in line F of FIG. 9. This waveform as previously explained represents a partially decoded waveform. The second input signal applied to the second decoding means 238 is the Q 316 waveform shown on line G of FIG. 9. The third input signal applied to the second decoding means 238 is the output of the AND-gate 218, as shown on line H of FIG. 9.

The operation of the second decoding means 238 is slightly different from the operation of the first decoding means 234. In effect, the waveform on line F of FIG. 9 is shifted into the second decoding means 238 under the control of the pulses present on lines G and H of FIG. 9. More specifically, the information on line F is shifted into the second decoding means 238 under the direction of the negative going edge of the signals shown on line G. The reset pulses, as shown on line H of FIG. 9, reset the second decoding means 238 to that stable state wherein it generates its low output signal at the Q 238 output terminal. The negative transition, at start of data cell two time on line G, shifts the low signal level corresponding at the same period of time in the waveform of line F into the second decoding means 238 changing it to that stable state wherein its low signal level is available at the Q 238 output terminal, as shown on line I. The next negative transition in the waveform shown on line G occurs at start of data cell three and shifts the higher level present on line F into the second decoding means. The higher output signal level is now present at the Q 238 terminal as shown on line I. The positive transition of the reset pulse from AND-gate 218, shown at start of data cell four time, resets the second decoding means to its other stable state wherein it generates its low output signal at the Q 238 terminal. The negative going transition of Q 316 occurring at start of data cell five time shifts the high signal level present on line F into the flip-flop 238 to change its stable state to generate its high output signal level at the Q 238 output terminal. The negative going transition of the Q 316 waveform present at start of data cell six time shifts the low signal level at Q 234 into the second decoding means 238, whereby its Q 238 terminal assumes its low signal level. The positive transition of the reset pulse at mid data cell six time does not effect the operation of the second decoding means 238 because these reset pulses only operate to reset the second decoding means to that stable state whereby it generates its low output signal at its Q 238 output terminal. Since the low output signal is already present at the Q 238 terminal, the reset pulse does not change the state of flip-flop 238.

When a pulse occurs simultaneously on lines E and H of FIG. 9, one pulse is redundant to the other. However, no ambiguity exists in the decoding of the Jordan code. Accordingly, there is no need to eliminate this redundant pulse by additional circuitry.

The negative going transition of the pulse on line G, occurring at the state of data cell seven time, shifts the lower signal level present on line F into the second decoding means 238 so as to generate the low output signal at the Q 238 terminal. The negative going transition of the pulse on line G, occurring at the start of data cell 8 time shifts the higher voltage present on line F into the second decoding means 238 so as it generates the high output signal at the Q 238 terminal. The negative going transition of the pulse shown on line G occurring at start of data cell nine time and start of data cell ten time do not change the signal level at Q 238. Both signal levels remain at the high level as shown on lines B and I. The positive going transition of the reset pulse occurring at start of data cell eleven time resets the second decoding means 238 to that stable state whereby it generates its lower output signal level on its Q 238 terminal.

The $\overline{Q}$ 238 terminal of the second decoding means 238 is the complement of the signal shown on the Q 238 terminal. By inspection, the $\overline{Q}$ 238 waveform is identical to the original NRZ waveform shown on line B but delayed one data cell time. Accordingly, the decoder circuit shown in FIGS. 4 and 5 changes the incoming Jordan encoded waveform to return to the original NRZ signal. The original NRZ signal is available at the output terminal 370 as shown in FIG. 5.

While a presently preferred embodiment has been described in detail, it should be appreciated that the invention is not to be limited except by the claim.

What is claimed is:

1. An apparatus for decoding digital data present in a succession of data cell times, comprising:

a digital data source for supplying an encoded digital data signal changing between first and second levels spaced at variable length intervals, said transitions only occurring at the start of data cell time and at mid data cell time and no transitions occurring a one quarter data cell time and three quarter data cell time;

means for generating a clock signal having a repetition rate of twice the data cell time, said clock signal having a same predetermined direction of transition at both the start of data cell time and at mid data cell time;

clock and phase generating means responsive to said clock signal generating means for generating a plurality of separate phase timing signals, each of said phase timing signals being a series of pulses having a duration less than a data cell time and having a predetermined direction of transition and having a phase displacement between corresponding pulses in the same data cell time in each of said other separate phase timing signals;

first detection means responsive to said encoded digital data signal for generating a first train of pulses, each pulse in said first train identifies each transition in said encoded digital data signal;

second detection means responsive to said clock signal generating means and to said first detection means for generating a second train of pulses, each pulse in said second train identifies the end of data cell time of one of said encoded digital data signals having a duration of at least two consecutive data cell times having the same predetermined signal level;

first decoding means responsive to said clock and phase generating means and to the output of said first detection means for generating a first level decode signal containing transitions indicative of transitions in the encoded digital data signal which occur at mid data cell time;

second decoding means responsive to said clock and phase generating means and to the output of said first detection means and to the output of said first decoding means for altering said first level decoded signal to contain additional non-redundant transitions indicative of the second transition in pairs of transitions generated by said first detection means, which pairs of transitions are separated by a single data cell time; and said second train of pulses from said second detection means being applied to said clock and phase generating means for synchronizing the outputs of said clock and phase generating means with said encoded digital data signal.

2. An apparatus for decoding digital data as recited in claim 1, wherein said clock and phase generating means further comprises:

a first bistable device having at least a set input, a clock input, a first output and a second output;

a second bistable device having at least a set input, a clock input, a first output and a second output;

said output from said clock generating means being applied directly to said clock input of said first bistable device and being applied through an inverter stage to said clock input of said second bistable device;

a first train of output pulses being generated by said first bistable device in response to said clock signal generated by said clock generating means, each of said pulses in said last mentioned first train having a predetermined direction of transition occurring at one quarter data cell time;

a second train of output pulses being generated by said first bistable device in response to said clock signal generated by said clock generating means, each of said pulses in said last mentioned second train having a predetermined direction of transition occurring at three-quarter data cell time;

a first train of output pulses being generated by said second bistable device in response to said clock signal generated by said clock generating means, each of said pulses in said last mentioned first train having a predetermined direction of transition occurring at start of data cell time; and a second train of output pulses being generated by said second bistable device in response to said clock signal generated by said clock generating means, each of said pulses in said last mentioned second train having a predetermined direction of transition occurring at mid data cell time.

3. An apparatus for decoding digital data as recited in claim 9, wherein said second decoding means further includes:

one shot means responsive to the output signal of said first detection means for providing an enabling output signal having a duration longer than one data cell time and shorter than one and a half data cell time; and AND-gate means responsive to said output signal of said first detection means and to the output of said one shot means for generating a train of pulses and each pulse being employed to identify the second pulse in a pair of pulses in the output from said first detection means, which pair of pulses are separated by one data cell interval.

4. An apparatus for decoding digital data as recited in claim 3, wherein said second decoding means further includes;

a first flip-flop having at least a first input terminal, a second input terminal and a first output terminal, said first flip-flop having two stable states, a first stable state providing an output signal at a first level at said output terminal, and a second stable state providing an output signal at a second level at said output terminal;

said output signal at said output terminal of said flip-flop of said first decoding means being shifted into said flip-flop of said second decoding means under the control of said transitions occurring at start of data cell time as generated by said clock and phase generator; and said flip-flop of said second decode means being reset to its second stable state by said output of said AND-gate means of said second decode means for generating a decoded digital data pulse train.

5. An apparatus for decoding digital data as recited in claim 1 wherein said first detection means comprises:

means for delaying the encoded digital data signal for a period less than a quarter of the data cell time; an exclusive OR means having a first input terminal and a second input terminal; and said first input terminal being responsive to said encoded digital data signal and said second input terminal being responsive to said delayed encoded digital signal for generating a pulse for each transition in said encoded digital data signal.

6. An apparatus for decoding digital data as recited in claim 2, wherein said first decoding means further includes:

AND-gate means having a first input, a second input and a first output;

said first input being responsive to said first train of pulses generated by said first bistable device of said clock and phase generating means; and said second input being responsive to said output of said first detection means for generating a train of pulses and each pulse being employed to identify signal level transitions in the encoded digital signal occurring at mid data cell time.

7. An apparatus for decoding digital data as recited in claim 6, wherein said first decoding means further includes:

a first flip-flop having at least a first input terminal, a second input terminal and a first output terminal;

said flip-flop having two stable states, a first stable state providing an output signal at a first level at said output terminal, and a second stable state providing an output signal at a second level at said output terminal;

said first flip-flop being responsive to said output pulses of said AND-gate to be set into its second stable state from its first stable state and to generate said second level output signal at said output terminal; and said first flip-flop being responsive to said signal generated by said clock and phase generator means at one quarter data cell time to be set into its first stable state from its second stable state and to generate said first level output signal at said output terminal.

* * * * *